United States Patent [19]
Vofsi et al.

[11] 3,919,292
[45] Nov. 11, 1975

[54] PRODUCTION OF CHLORINATED COTELOMERS

[75] Inventors: David Vofsi; Meir Asscher, both of Rehovot, Israel

[73] Assignee: Pechiney-Saint-Gobain, Courbevoie, France

[22] Filed: Mar. 9, 1973

[21] Appl. No.: 339,874

Related U.S. Application Data

[62] Division of Ser. No. 812,296, April 1, 1969, Pat. No. 3,742,019.

[52] U.S. Cl. .......................... 260/486 H; 260/485 H
[51] Int. Cl.[2] .......................... C07C 69/54
[58] Field of Search .......................... 260/486 H, 485 H

[56] References Cited

UNITED STATES PATENTS

| | | | |
|---|---|---|---|
| 2,440,800 | 5/1948 | Hanford et al. | 260/465.7 |
| 2,440,801 | 5/1948 | Hanford et al. | 260/465.7 |
| 2,725,411 | 11/1955 | Ladd et al. | 260/465.7 |
| 2,837,559 | 6/1958 | Fields | 260/465.7 |

*Primary Examiner*—James A. Patten
*Assistant Examiner*—Paul J. Killos

[57] ABSTRACT

The production of chlorinated cotelomers in which a homogeneous solution of mixtures of vinyl chloride and vinylidine chloride or a binary or tertiary mixture of vinyl chloride and/or vinylidene chloride with a non-chlorinated vinyl monomer are polymerized in the presence of chloroform or carbon tetrachloride with a catalyst in the form of a ferrous or ferric compound.

12 Claims, No Drawings

PRODUCTION OF CHLORINATED COTELOMERS

This is a division, of application Ser. No. 812,296, filed Apr. 1, 1969, now U.S. Pat. No. 3,742,019.

The present invention relates to a method and has for its object the production of chlorinated cotelomers wherein a homogeneous solution containing mixtures of vinyl chloride and vinylidene chloride or a binary or tertiary mixture of vinyl chloride and/or vinylidene chloride with a non-chlorinated vinyl monomer and chloroform or carbon tetrachloride is heated in the presence of an iron compound as catalyst.

The molar ratio of the monomers in the mixtures which must be subjected to telomerization depends on their relative reactivity and may moreover vary within wide limits. However, in practical operations the molar ratios that are preferred are between 1:10 and 10:1 for the binary mixtures. Generally, in the case of ternary mixtures, none of the monomers will be present in a molar ratio higher than 6:1 in relation to each of the other two monomers. The molar ratio between chloroform and carbon tetrachloride and the total quantity of the monomers may vary from 1:1 to 1:10.

A larger proportion of chloroform or carbon tetrachloride has no unfavorable effect on the reaction, but offers few advantages.

The non-chlorinated vinyl monomers suitable under the method of this invention are, for example, acrylic or methacrylic acid, their salts, e.g. the tin, zinc, barium, cadmium, sodium or lead salts, and their derivates, such as acrylonitrile, acrylamide, alkyl acrylates containing from 4 to 11 carbon atoms, methacrylonitrile, alkyl methacrylates containing from 5 to 12 carbon atoms; fumaric or maleic acid, their salts and their organic derivates such as alkyl maleates or alkyl fumarates containing not more than 20 carbon atoms; styrene, butadiene, isoprene and maleic anhydride. When one of the monomers used is a salt, its proportion should not exceed a molar ratio of 1:10 with respect to the other monomer or monomers.

The basic iron catalyst may either be an uncharged complex such as iron acetylacetonate, or a salt, preferably a bromide or an anhydrous chloride, or preferably a hydrated one. The ferric compounds are preferably used in the presence of a reducing agent capable of converting them into ferrous compounds during telomerization, such as benzoin, acetaldehyde, isobutyraldehyde, benzaldehyde, stannous chloride, acetoin, ammonia or ammonium sulfite, The reducing agent may be present from the start or be added gradually during the reaction. When cosolvents are used, as indicated below, some also may be used as reducing agents. Similarly, one of the co-monomers may serve as reducing agent. The basic iron compound is preferably used in a quantity from 0.05 to 10 moles percent figured in relation to the total quantity of the monomers and preferably between 0.1 and 5 mole percent.

In order to assure the homogeneity of the reactive mixture, the use of a co-solvent may be advantageous, but it is not always necessary. No limitation exists with regard to the co-solvents, except that they must be inert in relation to the reagents. Suitable solvents are, for example, methanol, ethanol, n-propanol, isopropanol, n-butanol, methylene chloride, dimethyl formamide and acetonitrile. When the co-solvent is an alcohol it may at the same time be used as reducing agent.

If the catalyst is an iron salt, its solubility in the reactive medium can be increased by adding a soluble chloride or bromide which is inert in relation to the reagents, such as alkyl ammonium chloride or bromide or lithium chloride or bromide. Such a chloride or bromide may be added advantageously in a proportion from 0.05 to 4, preferably from 1 to 3 moles for each mole of iron salt.

The cotelomers produced according to the method of the invention are liquids or semi-solids of an average molecular weight generally between 400 and 8,000, and a chlorine content between 10 and 70 percent. They are used in particular as softeners or plasticizers for synthetic resins which offer, in addition, self-extinguishability and non-inflammability in view of their high chlorine content. They can be described as consisting of chains of units of the constituent monomers which are chemically bound to fragments of a chloroform or carbon tetrachloride molecule at each end of the polymer chain.

The use of iron catalysts according to the invention makes it possible to manufacture cotelomers having the desired liquid or semi-solid consistency and containing up to 70 percent chlorine. The proportion of the iron compound used determines the molecular weight of the cotelomers, and consequently their consistency, inasmuch as the molecular weight is indirectly proportional to the quantity of iron base catalyst used. This result is surprising and could not be anticipated because it is known that the telomerization of one single monomer — as distinguished from the monomer mixture according to the invention, with chloroform or carbon tetrachloride with the aid of a catalyst, particularly a ferric or a ferrous salt, produces mixtures of telomers in which the monomeric and dimeric telomers are present in a high proportion and even predominate. Thus telomerization of vinyl chloride with carbon tetrachloride, in presence of an iron chloride catalyst and under certain reaction conditions, yields a reaction product in which the proportion of 1,1,1,3,3-pentachloro-propane may reach 55 percent or even more. Similar conditions exist in cases where butadiene and styrene are used individually as monomer reagents of the telomerization process (Israeli patent applications No. 16,079 - 16,080). In contrast, the method according to the invention, produces telomers which are entirely or predominantly polymeric.

The following examples are given for illustration and not limitative of the present invention:

EXAMPLE 1

A homogeneous mixture of 14.5 grams (0.15 moles) of vinylidene chloride, 8.0 grams (0.15 mole) of acrylonitrile, 15.4 grams (0.1 mole) carbon tetrachloride, 540 mg (2 m moles) ferric chloride hexahydrate, 412 mg (3 m moles) triethyl ammonium chloride, 424 mg (2 m moles) benzoin and 5 ml acetonitrile are sealed in a glass vial under a pressure of 0.2 mm and heated at 110° C for 4 hours.

After cooling, the vial is opened and the reactive mixture is washed in 1 N aqueous hydrochloric acid, then with water, dried on calcium chloride, and after elimination of the carbon tetrachloride and unconverted monomers by heating under vacuum, the mixture is finally heated at 150° C under 0.2 mm pressure for 1 hour. The product is composed of 11.6 grams cotelomers with an average molecular weight of 1570 and a chlorine rate of 50.4 percent by weight. The molecular weight has been determined throughout by the isopiestic method which is the best method for the range of molecular weights in question.

EXAMPLE 2

11 tests are carried out in the same manner as in Example 1, except that 9.4 grams (0.15 mole) vinyl chloride are used as one of the monomers while the comonomer, the solvent, the quantity of catalyst and the reactive conditions were varied. The changes in relation to Example 1 and the results obtained are compiled in the following table.

| Test No. | Co-monomer | grams | Solvent | ml | $FeCl_3$ 6 $H_2O$ m mole | Temp. °C | Hrs. | Yield in co-telo-mer grams | Cl % | Molecular weight |
|---|---|---|---|---|---|---|---|---|---|---|
| 2 | Acrylo-nitrile | 8 | $CM_2Cl_2$ | 10 | 2 | 110 | 20 | 7.5 | 43.5 | 510 |
| 3 | do. | 8 | do. | 10 | 1 | 82 | 20 | 2.5 | 33 | 880 |
| 4 | do. | 8 | do. | 10 | 2 | 110 | 20 | 9.0 | 42.5 | 760 |
| 5 | do. | 8 | $CH_3CN$ | 5 | 1 | 110 | 10 | 12.9 | 40 | 780 |
| 6 | do. | 8 | do. | 5 | 2 | 110 | 9 | 15.3 | 45 | 490 |
| 7 | Ethyl acrylate | 15 | $(CH_3)_2$ CHOH | 10 | 1 | 82 | 20 | 10.7 | 20 | 1070 |
| 8 | do. | 15 | do. | 10 | 2 | 110 | 20 | 14.4 | 30 | 840 |
| 9 | do. | 15 | $CH_3CN$ | 10 | 2 | 110 | 18 | 21.5 | 35 | 870 |
| 10 | do. | 15 | do. | 10 | 1 | 110 | 6 | 23.5 | 37 | 820 |
| 11 | Acrylic Acid | 10.8 | do. | 5 | 2 | 110 | 8 | 6.5 | 37.3 | 770 |
| 12 | Vinylidene Chlo-ride | 14.6 | do. | 10 | 2 | 110 | 1 | 17.2 | 70 | 2030 |

EXAMPLE 3

A homogeneous mixture containing 12.9 grams (0.15 mole) methyl acrylate, 9.4 grams (0.15 mole) vinyl chloride, 12 grams (0.1 mole) chloroform, 270 mg (1 m mole) ferric chloride hexahydrate, 206 mg (1.5 m moles) triethylammonium chloride and 10 ml ethanol are sealed in a glass vial under a pressure of 0.2 mm Hg and heated for 48 hours at 125° C.

Subsequently, the vial is opened and the reactive mixture is then treated as described in Example 1. The yield is 6 grams colorless cotelomer with an average molecular weight of 860 and a chlorine rate of 22.3 percent by weight.

EXAMPLE 4

A homogeneous mixture containing 9.4 grams (0.15 mole) vinyl chloride, 4.85 grams (0.05 mole) vinylidene chloride, 6.4 grams (0.05 mole) n-butyl acrylate, 15.4 grams (0.1 mole) carbon tetrachloride, 224 grams (1 m mole) ferrous chloride tetrahydrate, 206 mg (1.5 m mole) triethylammonium chloride and 10 ml n-butanol, are sealed in a glass vial and heated at 110° C for 20 hours.

After cooling, the reactive product is treated as described in Example 1. The product consists of 10.3 grams cotelomer with an average molecular weight of 1920 and a chlorine rate of 47.3 percent by weight.

EXAMPLE 5

A homogeneous mixture containing 9.4 grams (0.15 mole) vinyl chloride, 5.2 grams (0.05 mole) styrene, 4.3 grams (0.05 mole) methyl acrylate, 15.4 grams (0.1 mole) carbon tetrachloride, 224 mg (1 m mole) ferrous chloride tetrahydrate and 10 ml methanol are sealed in a glass vial and heated at 125° C for 10 hours.

The reactive mixture is treated like in Example 1. The output is 8.4 grams of a cotelomer with an average molecular weight of 625 and a chlorine rate of 28.7 percent by weight.

EXAMPLE 6

A homogeneous mixture containing 14.5 grams (0.15 mole) vinylidene chloride, 4 grams (0.075 mole) acrylonitrile, 22.8 grams (0.1 mole) di-n-butyl fumarate, 15.4 grams carbon tetrachloride, 270 mg (1 m mole) ferric chloride hexahydrate and 15 ml n-butanol are sealed in a glass jar and heated at 120° for 15 hours.

The reactive mixture is treated as in Example 1. The product consists of 16.3 grams cotelomer with an average molecular weight of 1630 and a chlorine rate of 36.4 percent by weight.

EXAMPLE 7

A homogeneous mixture containing 19 g (0.3 mole) of vinylchloride, 10 g (0.1 mole) of ethyl acrylate, 17 g (0.12 mole) of chloroform, 15 ml of ethanol, 360 mg (1.3 m moles) of ferric chloride hexahydrate and 275 mg (2 m moles) of triethylammonium chloride was heated at 125° C for 50 hours. The reaction mixture was worked up as described in Example 1. The product consisted of 3.2 g of a colorless cotelomer having a chlorine content of 25.9 percent and a molecular weight of 790.

EXAMPLE 8

Example 7 was repeated with 20 g (0.13 mole) carbon tetrachloride instead of chloroform. After 3 hours heating at 125° C and working up as described in Example 1, the product consisted of 3.0 g of a colorless cotelomer having a chlorine content of 30.8 percent and a molecular weight of 710.

EXAMPLE 9

Example 8 was repeated with the addition of 94 mg (1.3 m moles) of isobutyraldehyde to the reaction mixture. After 2 hours' heating at 125° C, working up as described in Example 1, the product consisted of 6.1 g of a colorless cotelomer having a chlorine content of 36.7 percent and a molecular weight of 630.

EXAMPLE 10

A homogeneous mixture of 6.3 g (0.1 mole) of vinyl chloride, 28.8 g (0.2 mole) of dimethyl maleate, 4 g (0.02 mole) of cadmium acrylate, 20 g (0.13 mole) of carbon tetrachloride, 30 ml of ethanol, 360 mg (1.3 m mole) of ferric chloride hexahydrate, 276 mg (2 m moles) of triethylammonium chloride and 188 mg (2.6 m moles) of isobutyraldehyde was heated at 125° C for 8 hours. After the reaction, the excess of vinyl chloride was released and the residue was taken up in methylene chloride. This solution was washed well with an aqueous solution of ammonium chloride and dried on calcium chloride. After evaporation of the solvent and unconverted monomer, 12 g of cotelomer remained which contained 38.5 percent of chlorine and 2.7 percent of cadmium.

EXAMPLE 11

1 A homogeneous mixture of 19 g (0.3 mole) of vinyl chloride, 10 g (0.1 mole) of ethyl acrylate, 20 g (0.13 mole) of carbon tetrachloride, 15 ml of ethanol, 360 mg (1.3 m moles) of ferric chloride hexahydrate, 276 mg (1.3 m moles) of benzoin and 275 mg of triethylammonium chloride was heated at 125° C for 30 minutes. After cooling and releasing of unconverted vinyl chloride, the reaction mixture was worked up as described in Example 1. The product consisted of 25 g of a cotelomer which was a viscous liquid having a chlorine content of 36.7 percent and a molecular weight of 610.

2 By way of comparison the following two telomerization processes were effected with single monomers (homotelomerization).

a. The process was carried out under the same conditions as in paragraph (1) but with 25.2 g (0.4 mole) of vinyl chloride and without ethyl acrylate. The product was a telomer of vinyl chloride and carbon tetrachloride which had the following fractions: 4.8 g of bp/25: 80°–100° C (bath up to 160°), 10.2 g of bp/0.1: 60°–90°(bath up to 150°), 7.6 g of a viscous distillation residue having a molecular weight of 365 and 1.1 g of solid telomer.

b. 7.75 g (0.08 mole) of vinylidene chloride and 4 g (0.026 mole) of carbon tetrachloride were mixed with a solution of 72 mg (0.26 m mole) of ferric chloride hexahydrate, 55 mg (0.4 m mole) of triethylammonium chloride and 55 mg (0.26 mmole) of benzoin in 3 ml ethanol. The resulting homogeneous solution was sealed in a Carius-tube under 0.15 mm pressure, and heated at 125° C for 1 hour. Much precipitate appeared during the reaction. After cooling and opening of the tube, the reaction mixture was suction-filtered, the filter residue was washed well with ethanol and dried. 2.4 g of homotelomer of vinylidene chloride and carbon tetrachloride was thus obtained as a greyish-white powder melting between 170° and 190° C. The filtrate was evaporated in vacuo and its residue taken up in methylene chloride. After washing with aqueous 1N hydrochloric acid and drying, the solvent was evaporated in vacuo at 50° C leaving 0.25 g of residue. The same result is obtained with acetonitrile instead of ethanol as the solvent for iron chloride. About 90 percent of the total product appears thus to be a solid.

The comparison of experiments 2 (a) and 2 (b) with experiment 1 of Example 11 shows the following facts:

1. The homotelomerization of vinyl chloride, under the conditions described, produced a mixture of telomers of which about 68 percent were comparatively volatile, 4.7 percent solid, and only the balance of 27.3 percent constituted a viscous product of a molecular weight comparable to the lowest limits of the range of molecular weights of the cotelomers according to the invention.

The replacement of only 25 percent of the vinyl chloride by ethyl acrylate gave the desired, favorable result according to experiment (1) of Example 11.

2. The homotelomerization of vinylidene chloride yielded a product of which about 90 percent was solid.

This is to be compared with the results of the cotelomerization of vinyl chloride and vinylidene chloride according to batch 12 in the Table in Example 2.

We claim:

1. A method for producing cotelomers comprising reacting a homogeneous solution comprising a mixture of a chloroolefin selected from the group consisting of vinyl chloride, vinylidene chloride and mixtures thereof and a non-chlorinated vinyl monomer selected from the group consisting of acrylic and methacrylic acids, their salts and alkyl esters, fumaric acid, maleic acid and maleic anhydride with a chloromethane selected from the group consisting of chloroform, carbon tetrachloride and mixtures thereof, with the mole ratio of the chloromethane to the total of the chloroolefin and the vinyl monomer being in the range of 1:1 to 1:10, in the presence of a catalyst selected from the group consisting of ferrous and ferric compounds, with the catalyst being present in an amount within the range of 0.05 to 10 mole percent based on the total of the chloroolefin and the vinyl monomer.

2. A method as claimed in claim 1 wherein said mixture is a mixture of vinyl chloride and/or vinylidene chloride and an alkyl acrylate or methacrylate.

3. The method as claimed in claim 1 in which the non-chlorinated monomer is selected from the group consisting of an acrylic derivative, a methacrylic derivative, a fumaric derivative and a maleic derivative.

4. The method as claimed in claim 1 in which the catalyst is a salt of the ferrous or ferric compound.

5. The method as claimed in claim 1 in which the salt is a bromide or chloride of the ferrous or ferric compound.

6. The method as claimed in claim 1 in which the catalyst is an uncharged complex of the ferrous or ferric compound.

7. The method as claimed in claim 1 in which the catalyst is a ferric compound and the reactive mixture contains a reducing agent capable of converting the ferric compound to a ferrous compound during telomerization.

8. The method as claimed in claim 1 in which a soluble chloride or bromide which is inert to the reactants is added to the reaction mixture.

9. The method as claimed in claim 8 in which the soluble chloride or bromide is selected from the group consisting of alkyl ammonium chloride, alkyl ammonium bromide, lithium chloride and lithium bromide.

10. The method as claimed in claim 1 in which the reaction mixture contains a co-solvent or reagent which is inert with respect to the materials making up the reaction mixture.

11. The method as claimed in claim 10 in which the cosolvent is selected from the group consisting of methanol, ethanol, n-propanol, isopropanol, n-butanol, methylene chloride, dimethyl formamide and acetonitrile.

12. A chlorinated cotelomer obtained by the method of claim 1 having an average molecular weight within the range of 400 to 8,000 and a chlorine content within the range of 10 percent to 70 percent.

* * * * *

UNITED STATES PATENT OFFICE
CERTIFICATE OF CORRECTION

Patent No. 3,919,292 Dated November 11, 1975

Inventor(s) David Vofsi and Meir Asscher

It is certified that error appears in the above-identified patent and that said Letters Patent are hereby corrected as shown below:

Column 4, line 45, please change "0.12" to -- 0.13 --.

Signed and Sealed this

*first* Day of *June 1976*

[SEAL]

*Attest:*

RUTH C. MASON
*Attesting Officer*

C. MARSHALL DANN
*Commissioner of Patents and Trademarks*